Figure 1:
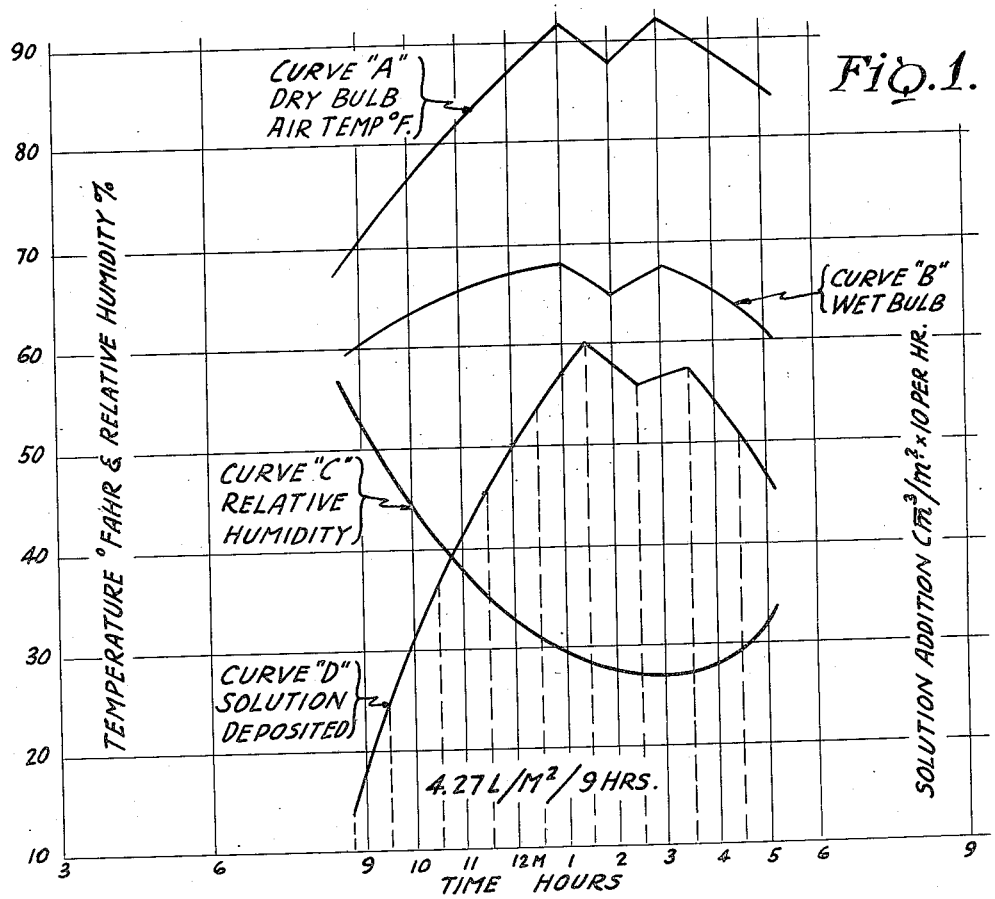

Patented Dec. 5, 1950

2,532,924

UNITED STATES PATENT OFFICE 2,532,924

SOLAR EVAPORATION OF BRINES

Sherman D. Lesesne, Iquique, Chile, assignor to Compania Salitrera de Tarapaca y Antofagasta, a corporation of Chile Application February 2, 1948, Serial No. 5,739
In Chile April 19, 1947

5 Claims. (Cl. 159—49)

This invention relates to the recovery of valuable salts from brines by means of solar evaporation of the solution, and it has particular reference to a method of so controlling the rate of evaporation as to assure the production of dry salt with a minimum of equipment and operating expense.

It is, of course, common knowledge that a salt solution will evaporate upon exposure to warm dry air, leaving a residue of the solid material. This principle has been employed to some extent in the pan evaporation of brines formed of water and naturally occurring mineral deposits—in a shallow iron pan of suitable size is filled with the solution and is exposed to the atmosphere until the water evaporates. An objection to this procedure is that it is time-consuming, and the salt residue may also contain so high a percentage of water of composition and entrained free water that further dehydration with heat is indicated. A more expeditious method is to dehydrate in known types of evaporators with artificial heat—time is saved, but the cost for equipment and operation is greatly increased.

According to the present invention, dehydration of brines and the recovery of salts therein is effected by means of natural or solar evaporation, and without the necessity of utilizing expensive apparatus or artificial heat. In distinction to the known pan evaporation, the present process contemplates the controlled distribution of a brine over an evaporating area, in successive thin sheets or films which are applied at time intervals proportioned to the free evaporation rate for the immediate atmospheric conditions. Each film is permitted to dry before the next is applied. The "free evaporation rate," as that expression is herein employed, is the rate at which a solution composed of the solvent and the solute (salts to be recovered) will lose its water to the atmosphere. It may be expressed as $Q_m/A \times T$, where $Q_m$ is the amount (in terms of mass or volume of solution) evaporated over an area $A$ in time $T$. Such rate, of course, may be determined by simple test and observation, and the test should be conducted with the liquid surface being well exposed. In other words, evaporation from a shallow dish will proceed more rapidly than from a necked flask. As surface evaporation from a strong unstirred brine tends to increase the salt concentration on the surface layer, and thereby form a crust, the free evaporation rate of such a solution is invariably less than the free evaporation rate of pure water.

In this specification, examples will be cited from the practice of the invention in Tarapaca Province, Republic of Chile, where there occur large deposits of sodium nitrate admixed with other compounds. These deposits are found as an ore comprising sodium nitrate crystals intimately mixed in a semi-cemented state with other soluble salts, such as sodium chloride and sodium and magnesium sulphates, and with insoluble matter such as small stones, sand, and clay. Separation of the valuable salts from the gangue is effected by leaching. The region is relatively arid, and in this respect is comparable to certain southwestern portions of the United States wherein valuable mineral deposits also occur. It should therefore be understood that the invention is applicable to the evaporation of various kinds of solutions, and its utility is not restricted to extremely high atmospheric temperatures. For most satisfactory results, the prevailing atmosphere should be clear and sunny, of low humidity, and with daylight temperatures normally in excess of 70° Fahr. As an example, weather measurements made on the pampa during the first two weeks of June showed maximum daily temperatures of from 70° to 83° Fahr., with a mean of about 78° occurring between 1:00 p. m. and 4:00 p. m., during which period the relative humidity ranged from 18 to 46 per cent with an average below 30%. Low daily temperatures during the same period varied between 38° and 46° Fahr., with an average of about 41°, and they occurred between 6:00 a. m. and 9:00 a. m. The high for relative humidity occurred about 9:00 p. m. on the average, and ranged from as low as 32% to complete saturation on two evenings. Such climatic conditions are entirely suitable, and it will be seen that they are not unusual for many parts of the world where solar evaporation is desired.

Figure 2:
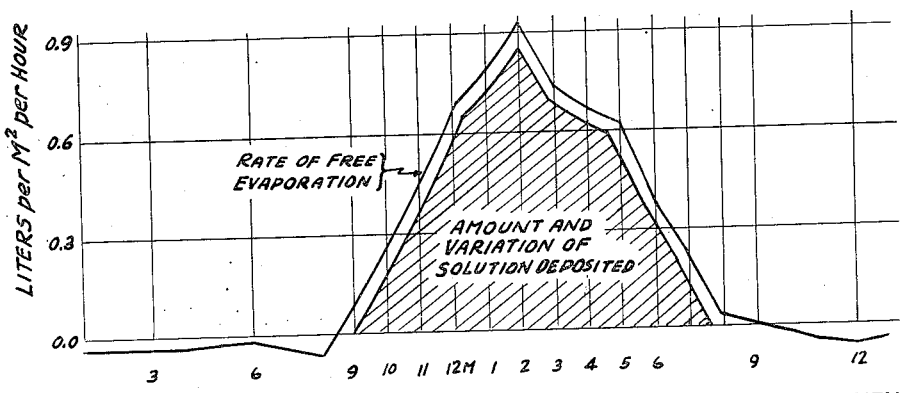

In the subsequent portions of this description, reference will be made to the diagrams shown on the appended drawing, wherein:

Fig. 1 is a graph showing psychrometric conditions during a typical operating day and also the quantity of brine evaporated; and Fig. 2 is a diagram illustrating controlled evaporation by the present process in terms of quantity and also in relation to the solution free evaporation rate.

Before proceeding with a discussion of the figures, a general outline of suitable operating procedures will be given. There is first selected a suitable evaporating ground area, which should be fairly smooth although it need not be level. Such area may have a surface of the naturally occurring sand or clay—the clay is of course less pervious to a solution poured onto it, but it has been found that porous sand also makes a suitable bed or foundation when the process is properly conducted. The evaporating area may be of such extent as can be comfortably attended to. Pilot plant areas of from 40 to 100 square meters have been initially utilized, and a full scale working area may be 200 x 1000 meters. Preliminary operations on a small or pilot plant area were found useful in confirming the utility of the process and justifying the cost of preparing larger beds. This area is to receive repeated additions of the brine to be evaporated, which is spread uniformly over the surface, first on the bare ground, and thereafter on the salt deposit.

Some equipment is economically helpful to distribute the solution. In a large working area, such as that just alluded to, a roadway or track may be built in a loop around the surface to accommodate a moving car provided with spraying arms which traverse the area a short distance above the surface. The car may be a tank car carrying a large volume of solution, or provision may be made to supply the brine from a ditch located along the roadway. When the distributing pipes or spray arms are provided with orifices of fixed size, and the liquid is forced through them at a constant rate, variations of intensity of depositing the solution may be effected by controlling the velocity of the vehicle. Alternatively, the rate of pumping may be varied. The basic function of any such equipment is simply to spread a thin sheet of the solution over each unit area of the bed, with control over the amounts deposited in units of time. With this in mind, it will be readily seen that the precise nature of the handling equipment admits of a wide range of selection.

A typical Chilean nitrate solution susceptible of evaporation may analyze as follows:

| | Grams per liter |
|---|---|
| $NaNO_3$ | 120.0 |
| $NaCl$ | 231.5 |
| $Na_2SO_4$ | 140.3 |
| Mg salts | 20.6 |
| Other | 18.0 |
| Total solids | 530 |

This solution was sprayed over a bed of 42 square meters area in successive increments from 8:00 a. m. to 5:00 p. m. at an average hourly rate of 0.5 liter per square meter. As each layer or film was deposited, it was seen to evaporate, as ascertained by the fact that, when first deposited, it glistened in the sun, but within a few minutes became lusterless. Approximately ten deposits per hour were effected, thus making the rate of solution deposition per minute about eight cubic centimeters of solution per square meter. At the end of three months, the bed was covered with a crust of salts ten centimeters thick, and it was then ready to be harvested by bulldozer and truck. When first deposited, the initially drying salts retained about 10% moisture. However, by harvest time the residual moisture was only 2%.

In connection with the foregoing operation, it may be noted that the free evaporation rate of the brine from a pan was 6.6 liters of solution per square meter per day, or about 0.55 liter per hour for the operating day. At the same time, the free evaporation rate of water was approximately 10 liters per day. The solution evaporation rate is accordingly less, and it tends to decrease as the magnesium salt content increases. Further, the distribution rate of the brine was less than the solution free evaporation rate. This limitation was imposed to preclude the penetration of the soil, or the deposited salt layer, by the applied solution, as oversaturation of the bed would increase the residual water content of the deposit, and also invite some leaching. When the brine is deposited at such a rate that it may evaporate rapidly by solar heat, the porosity of the soil is not an adverse factor, as penetration can be limited to a depth of a centimeter or two.

In the foregoing example, rates of distribution in terms of minutes and hours have been given, together with the gloss effect as an index to the determination of addition rate. For best results, it is better practice to vary the rate of addition in accordance with the instantaneous free evaporation rate during the day. This is illustrated in Fig. 2. The upper line represents free evaporation rate during a typical day. It will be seen that, from about 9:00 p. m. to 8:00 a. m. the evaporation rate is negative, moisture being precipitated from the chilled atmosphere. This does not mean actual rainfall, but simply that the air is so moisture laden, for its existing temperature, that natural evaporation does not take place. Beginning about 8:00 a. m. the increasing air temperature causes a lowering of the relative humidity, thus increasing the rate until about 2:00 p. m., after which the rate decreases. Fig. 2 has been plotted from the observations over a four day period in January, during which the rate rose from zero to over 0.9 liter per square meter per hour at midday.

The underlying shaded area represents the distribution of the foregoing brine over the bed, and it will be seen that the amount applied was increased and decreased in proportion to the free evaporation rate. Operations were begun when the free rate was about 0.1 liter per square meter per hour, and the solution was applied more rapidly as the free rate increased, to a maximum of 0.85 liter per square meter per hour. Total deposition of solution for the working day amounted to about 4.8 liters per square meter. As before, the films were deposited in thin layers at short time intervals, or after the preceding film had substantially dried.

As noted above, the increase in rate of deposition can be effected either by metering the brine at a variable flow rate, or by feeding at a constant flow with increased speed of application. A unit feeding of say fifty to sixty cubic centimeters per meter may be made with change in car velocity, thereby controlling the amount deposited per square meter. When the total amount deposited per unit area at any one feeding is so great that the solution soaks into the underlying deposit, rather than evaporates, one of the benefits of the process has been impaired. To preclude this result, the car is speeded up and the driver can soon learn to regulate his speed, knowing from experience how soon the gloss effect should disappear.

Variable intensity or quantity of deposition at a substantially constant application time rate (that is, at uniform intervals of time) may be illustrated by the following example, to be considered in connection with Fig. 1. A strong brine was distributed over the bed, and as applied it has the following composition:

| | Grams per liter |
|---|---|
| $NaNO_3$ | 357.9 |
| $NaCl$ | 177.2 |
| $Na_2SO_4$ | 53.8 |
| Mg (as such) | 26.5 |
| K (as such) | 30 |
| $Na_2B_4O_7$ | 10.2 |
| Elemental iodine | 3.9 |
| Total solids | 662 |

It will be seen that this is a highly concentrated brine. Herein, as in the previous example, the present process differs from commercial pan evaporation, wherein it has been found by experience that the operation should start with a relatively weak solution.

This brine was distributed over the bed, by means of a constantly moving spray nozzle, at a variable quantity of deposit in unit increments of time, in direct proportion to the difference between dry and wet bulb temperatures. Fig. 1 shows (curve A) the dry bulb or normal atmospheric temperature during the working day; (curve B) the wet bulb temperature over the bed; (curve C) the relative humidity; and (curve D) the amount of liquid deposited from time to time. The deposition was effected at five minute intervals, the wet and dry bulb readings being made continuously in the traveling vehicle to ascertain the proper concentration.

A few of the readings may be tabulated as follows:

| Time of Application | Temp. Degrees, Fahr. | | $t_d-t_w$ | Relative Humidity, Per Cent | Solution deposited in c. c. per sq. m. |
| --- | --- | --- | --- | --- | --- |
| | Dry Bulb ($t_d$) | Wet Bulb ($t_w$) | | | |
| 8:50 a. m | 69 | 59 | 10 | 54 | 20 |
| 8:55 | 70 | 60 | 10 | 55 | 20 |
| 11:30 | 85 | 66 | 19 | 35 | 38 |
| 11:35 | 85 | 67 | 18 | 38 | 36 |
| 12:55 | 92 | 68 | 24 | 28 | 48 |
| 13:00 | 92 | 68 | 24 | 28 | 48 |
| 14:55 | 94 | 69 | 25 | 27 | 50 |
| 15:00 | 92 | 67 | 25 | 26 | 50 |

It will be seen that in this example the amount deposited at each unit interval of spraying time is less than the free evaporation rate for the same interval, and it is also less than the amount of liquid which would penetrate the bed. This rate of addition, in terms of volume per square meter, is nominally twice the difference in dry and wet bulb temperatures, from which variations in the film thickness can be estimated. All films were sufficiently thin to evaporate before penetrating, and even thicker films can be tolerated. The loss of luster may also be observed when this procedure is followed. Inasmuch as the thermometers were carried on the vehicle, no account had to be taken of actual wind velocity or barometric pressure.

Comparing Figs. 1 and 2, it will be noted that Fig. 2 shows directly how the amount of solution added to the units of evaporating area is maintained at a value close to but below the free evaporation rate. In Fig. 1, this effect is obtained with respect to curve D as well, whose various elevations are proportional to the temperature differences between curves A and B at corresponding times. That is to say, in discussing Fig. 2, the free rate was taken as having been determined by comparative measurements from an open pan, whereas in Fig. 1 the free rate is determined by air and wet bulb temperature readings. Expressed otherwise, one may write:

$$\text{Free rate} = \frac{Q_m}{A \times T} > \frac{n(t_d - t_w)}{A \times T}$$

or $$Q_m > Q_s = n(t_d - t_w)$$

where $n$ is an empirically determined factor proportioned to the unit time interval and the character of the solution. For the example given, in terms of area in square meters, temperatures in degrees Fahrenheit, and time in five minute units, $n$ had a numerical value of ten. The employment of such a factor assures that the amount of solution deposited will not significantly penetrate the bed before becoming substantially evaporated.

It may be noted that the relative humidity curve C, while approximately accurate for the period of time plotted, has nevertheless been laid in from instantaneous readings which depart as much as several per cent in some instances. The deposition intensity curve D is therefore not exactly inversely proportional to the relative humidity, but only generally so. It is therefore better practice to effect distribution of the solution in accordance with the temperature differential between the thermometers. Inasmuch as the amount deposited per minute ranged from two or three to over sixteen cubic centimeters, and it is difficult to distribute so small amounts uniformly in such short periods of time, it is also preferable to choose a longer time interval, say five minutes, and distribute a greater amount as indicated by the foregoing figures. The time intervals and quantities may of course be varied to conform to local conditions.

From the foregoing examples, it will be seen that the invention permits the recovery of salts from solutions thereof without the necessity of artificially fired evaporators or large numbers of pans, since solar heat is utilized and the soil itself may serve as the bed. The amount of brine deposited on a unit area of the evaporating surface is made less than the free evaporation rate, thereby preventing leaching, and deposits are made repeatedly during the available portion of the working day in order to build up the bed as rapidly as possible. Practical experience with the process has shown that it is highly economical compared with prior methods. When the amount of atmospheric precipitation becomes so great that there is danger of leaching, the bed may be protected by temporary coverings, which can be removed when operations are resumed.

I claim:

1. A method of recovering soluble minerals from solutions thereof which comprises establishing an evaporating bed on a surface exposed to available sunshine, applying a film of the solution over the bed during daylight hours to evaporate the same by solar heat, applying a second film of solution to the same bed after the first layer has become substantially dehydrated, thereafter successively applying additional films to the same bed after the preceding film has become substantially dehydrated, and limiting the amounts of all films in respect of quantity of solution applied to less than the free evaporation rate of the solution.

2. A method of recovering soluble minerals from solutions thereof which comprises establishing an evaporating bed on a surface exposed to available sunshine, applying successive films of the solution to the same bed during daylight hours to successively evaporate said films by solar heat, applying each successive film only after the preceding film on the same bed has been substantially dehydrated, limiting the amount of any film to a quantity less than that which will soak into and be absorbed by dried preceding films, further limiting the amount of any said film to a quantity less than the free evaporation rate of the solution, and increasing and decreasing the amounts of the several films in proportion to increasing and decreasing changes in the free evaporation rate during the day.

3. In the recovery of saline minerals from brines containing the same, the process which comprises establishing a ground surface evaporating bed, spraying the bed with a thin film of the brine during those periods of the day when the bed is exposed to solar heat and there is a measurable difference between wet and dry bulb temperature readings over the bed, limiting the amount of solution per unit area of bed to less than the free evaporation rate at the time of spraying, repeating the spraying of the bed with more solution only after the preceding film has dried, continuing the spraying of the bed with additional thin films applied to preceding dried films, and raking up the deposited minerals when a crust of sufficient thickness has been obtained.

4. In the recovery of saline minerals from solutions thereof, the process which comprises laying out a ground area exposed during daylight hours to available sunshine, said area consisting of a plurality of unit measurement areas and constituting an evaporating bed, depositing on the unit areas of the bed a thin film of solution only when there is a measurable difference in the wet and dry bulb temperature readings over the bed, limiting the quantity deposited on said unit areas to less than the free evaporation rate over said area at the time the deposit is made, applying a second thin film likewise limited in quantity only after the first film has substantially dried, and varying the unit quantities of said deposits in proportion to changes in the free evaporation rate.

5. In the recovery of saline materials from solutions thereof, the process which comprises laying out an evaporating bed measurably divisible into unit areas, depositing on said areas a thin film of solution during daylight hours when the bed is exposed to solar heat and there is a measurable difference between wet and dry bulb thermometer readings over the bed and the areas thereof, limiting the amount of solution for each unit area to less than the free evaporation rate and proportioning the quantity to the difference between the thermometer readings, continually repeating the deposition of solution so limited and proportioned to the same areas only after the preceding deposit has dried, and further limiting the quantity of solution applied to an amount less than that which would be substantially absorbed by underlying layers.

SHERMAN D. LESESNE.

REFERENCES CITED

The following references are of record in the file of this patent:

UNITED STATES PATENTS

| Number | Name | Date |
|---|---|---|
| 681,407 | Coward | Aug. 27, 1901 |
| 1,304,931 | Bacon | May 27, 1919 |
| 1,317,954 | Burnham | Oct. 7, 1919 |
| 1,328,614 | Burnham | Jan. 20, 1920 |
| 1,506,946 | Schilling | Sept. 2, 1924 |
| 1,593,038 | Silsbee | July 20, 1926 |
| 1,689,526 | Gouger et al. | Oct. 30, 1928 |
| 1,724,558 | Burnham | Aug. 13, 1929 |
| 1,886,868 | Burnham | Nov. 8, 1932 |
| 1,903,510 | Laboon et al. | Apr. 11, 1933 |

OTHER REFERENCES

Chemical Eng., Volume 54, Number 6, June 1947, pp. 94–96.